United States Patent
Templeton et al.

(10) Patent No.: US 9,928,431 B2
(45) Date of Patent: Mar. 27, 2018

(54) VERIFYING A TARGET OBJECT WITH REVERSE-PARALLAX ANALYSIS

(71) Applicant: Waymo LLC, Mountain View, CA (US)

(72) Inventors: Bradley Templeton, Sunnyvale, CA (US); Nathaniel Fairfield, Mountain View, CA (US); Dave Ferguson, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 92 days.

(21) Appl. No.: 15/186,808

(22) Filed: Jun. 20, 2016

(65) Prior Publication Data

US 2016/0292519 A1   Oct. 6, 2016

Related U.S. Application Data

(63) Continuation of application No. 13/622,915, filed on Sep. 19, 2012, now Pat. No. 9,393,961.

(51) Int. Cl.
   *G06K 9/00* (2006.01)
   *G05D 1/02* (2006.01)
   (Continued)

(52) U.S. Cl.
   CPC ......... *G06K 9/00805* (2013.01); *B60W 30/14* (2013.01); *G05D 1/0246* (2013.01); *G06T 7/00* (2013.01); *G06T 7/292* (2017.01); *G06T 7/73* (2017.01); *G06T 7/77* (2017.01); *H04N 5/2253* (2013.01); *H04N 5/247* (2013.01); *G06K 9/00825* (2013.01); *G06T 2207/10016* (2013.01); *G06T 2207/30236* (2013.01); *G06T 2207/30241* (2013.01);
   (Continued)

(58) Field of Classification Search
   CPC .. G06T 7/73; G06T 7/77; G06T 7/292; G06T 7/00; H04N 5/2253; H04N 5/247; G05D 1/0246; G06K 9/00805; B60W 30/14
   See application file for complete search history.

(56) References Cited

U.S. PATENT DOCUMENTS 5,321,488 A * 6/1994 Irie .................... G01S 11/12
                                                                          180/167
6,728,582 B1 * 4/2004 Wallack ........... G05B 19/41875
                                                                          382/153

(Continued)

OTHER PUBLICATIONS

Kurtul, M. Caner, Road Lane and Traffic Sign Detection & Tracking for Autonomous Urban Driving, Masters Thesis Submission, 2010, Bogazici University, Turkey.

Primary Examiner — Neil Mikeska
(74) Attorney, Agent, or Firm — McDonnell Boehnen Hulbert & Berghoff LLP

(57) ABSTRACT

A vehicle configured to operate in an autonomous mode may engage in a reverse-parallax analysis that includes a vehicle system detecting an object, capturing via a camera located at a first location a first image of the detected object, retrieving location data specifying (i) a location of a target object, (ii) the first location, and (iii) a direction of the camera, and based on the location data and the position of the detected object in the first image, predicting where in a second image captured from a second location the detected object would appear if the detected object is the target object.

20 Claims, 6 Drawing Sheets

(51) Int. Cl.
    *G06T 7/00*     (2017.01)
    *H04N 5/247*     (2006.01)
    *H04N 5/225*     (2006.01)
    *B60W 30/14*     (2006.01)
    *G06T 7/73*     (2017.01)
    *G06T 7/77*     (2017.01)
    *G06T 7/292*     (2017.01)

(52) U.S. Cl.
    CPC ............ *G06T 2207/30244* (2013.01); *G06T 2207/30252* (2013.01); *G06T 2207/30261* (2013.01)

(56) References Cited

U.S. PATENT DOCUMENTS

| | | |
|---|---|---|
| 7,734,275 B2 | 6/2010 | Kubota et al. |
| 9,390,332 B2 * | 7/2016 | Takahashi ............. H04N 7/181 |
| 2003/0091228 A1 | 5/2003 | Nagaoka et al. |
| 2009/0087029 A1 | 4/2009 | Coleman et al. |
| 2010/0080419 A1 | 4/2010 | Okugi et al. |
| 2011/0116684 A1 | 5/2011 | Coffman et al. |
| 2011/0184605 A1 | 7/2011 | Neff |
| 2011/0249862 A1 | 10/2011 | Tokikura et al. |
| 2012/0170812 A1 | 7/2012 | Kamiyama |
| 2014/0355834 A1 | 12/2014 | Qureshi et al. |

\* cited by examiner

VERIFYING A TARGET OBJECT WITH REVERSE-PARALLAX ANALYSIS

CROSS-REFERENCE TO RELATED APPLICATION

The present application is a continuation of U.S. patent application Ser. No. 13/622,915, filed on Sep. 19, 2012, and entitled "Verifying a Target Object with Reverse-Parallax Analysis," which is herein incorporated by reference as if fully set forth in this description.

BACKGROUND

Unless otherwise indicated herein, the materials described in this section are not prior art to the claims in this application and are not admitted to be prior art by inclusion in this section.

Generally, a vehicle is a powered, movable machine. Examples of vehicles include cars, trucks, motorcycles, buses, bicycles, etc. Vehicles can be utilized for various tasks such as transportation of people and cargo, as well as many other uses.

Some vehicles may be partially or fully automated. For instance, when a vehicle is in an automated mode, some or all of the driving aspects of vehicle operation can be handled by a vehicle control system. In such cases, computing devices located on-board and/or in a server network could be operable to carry out functions such as planning a driving route, sensing aspects of the vehicle, sensing the environment of the vehicle, and controlling drive components such as steering, throttle, and brake. Thus, autonomous vehicles may reduce the need for human interaction in various aspects of vehicle operation.

SUMMARY

In operation, an autonomous vehicle sensor system may analyze the environment of the vehicle and attempt to detect and track objects of interest. By way of example, such objects may include traffic lights and street signs. Based on the state of a detected object, the vehicle may make certain decisions. For example, if the state of a certain traffic light is green, the vehicle may decide to proceed through an intersection. Such decisions can be based on identifying a detected object as a particular, target object.

Disclosed herein are methods and systems in which a vehicle engages in a reverse-parallax analysis of two or more images of a detected object in order to verify that the detected object is a target object. More particularly, in accordance with one embodiment, a method is provided and includes a vehicle system detecting an object, capturing via a camera located at a first location a first image of the detected object, retrieving location data specifying (i) a location of a target object, (ii) the first location, and (iii) a direction of the camera, and based on the location data and the position of the detected object in the first image, predicting where in a second image captured from a second location the detected object would appear if the detected object is the target object.

In accordance with another embodiment, another method is provided and includes a vehicle system simultaneously (i) capturing via a first camera located at a first location a first image of a detected object, and (ii) capturing via a second camera located at a second location a second image of the detected object, retrieving location data specifying (a) a location of a target object, (b) the first location, (c) the second location, (d) a direction of the first camera, and (e) a direction of the second camera, and based on the location data and a position of the detected object in the first image, predicting where in the second image the detected object would appear if the detected object is the target object.

In accordance with another embodiment, a vehicle is provided and includes a vision system, a processor, and data storage that includes instructions executable by the processor to: cause the vision system to capture via a camera located at a first location a first image of a detected object, the detected object having a position in the first image, retrieve location data specifying (i) a location of a target object, (ii) the first location, and (iii) a direction of the camera, and based on the location data and the position of the detected object in the first image, predict where in a second image captured from a second location the detected object would appear if the detected object is the target object.

In accordance with another embodiment, a non-transitory computer readable medium (CRM) is disclosed. This CRM has stored thereon instructions executable by a computing device to cause the computing device to perform functions, which may include detecting an object in a vehicle's environment, capturing via a camera located at a first location a first image of the detected object, the detected object having a position in the first image, retrieving location data specifying (i) a location of a target object, (ii) the first location, and (iii) a direction of the camera, and based on the location data and the position of the detected object in the first image, predicting where in a second image captured from a second location the detected object would appear if the detected object is the target object.

The foregoing summary is illustrative and is not intended to be in any way limiting. In addition to these illustrative aspects, embodiments, and features described above, further aspects, embodiments, and features will become apparent by reference to the figures and the following detailed description.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Example embodiments disclosed herein relate to operating a vehicle in an autonomous mode; and in particular, engaging in a reverse-parallax analysis in order to verify that a detected object is a target object.

Within the context of the disclosure, the vehicle could be operable in various modes of operation. In at least one embodiment, such modes of operation include manual, semi-autonomous, and autonomous modes. In particular, the autonomous mode may provide driving operation with little or no user interaction. Manual and semi-autonomous modes of operation could include greater degrees of user interaction.

Some methods disclosed herein could be carried out in part or in full by a vehicle configured to operate in an autonomous mode with or without external interaction (e.g., such as from a user of the vehicle). Other methods disclosed herein could be carried out in part or in full by a server. Those skilled in the art will understand that there are many different specific methods and systems that could be used during the operation of a vehicle. Each of these specific methods and systems are contemplated herein, and several example embodiments are described below.

Figure 1:
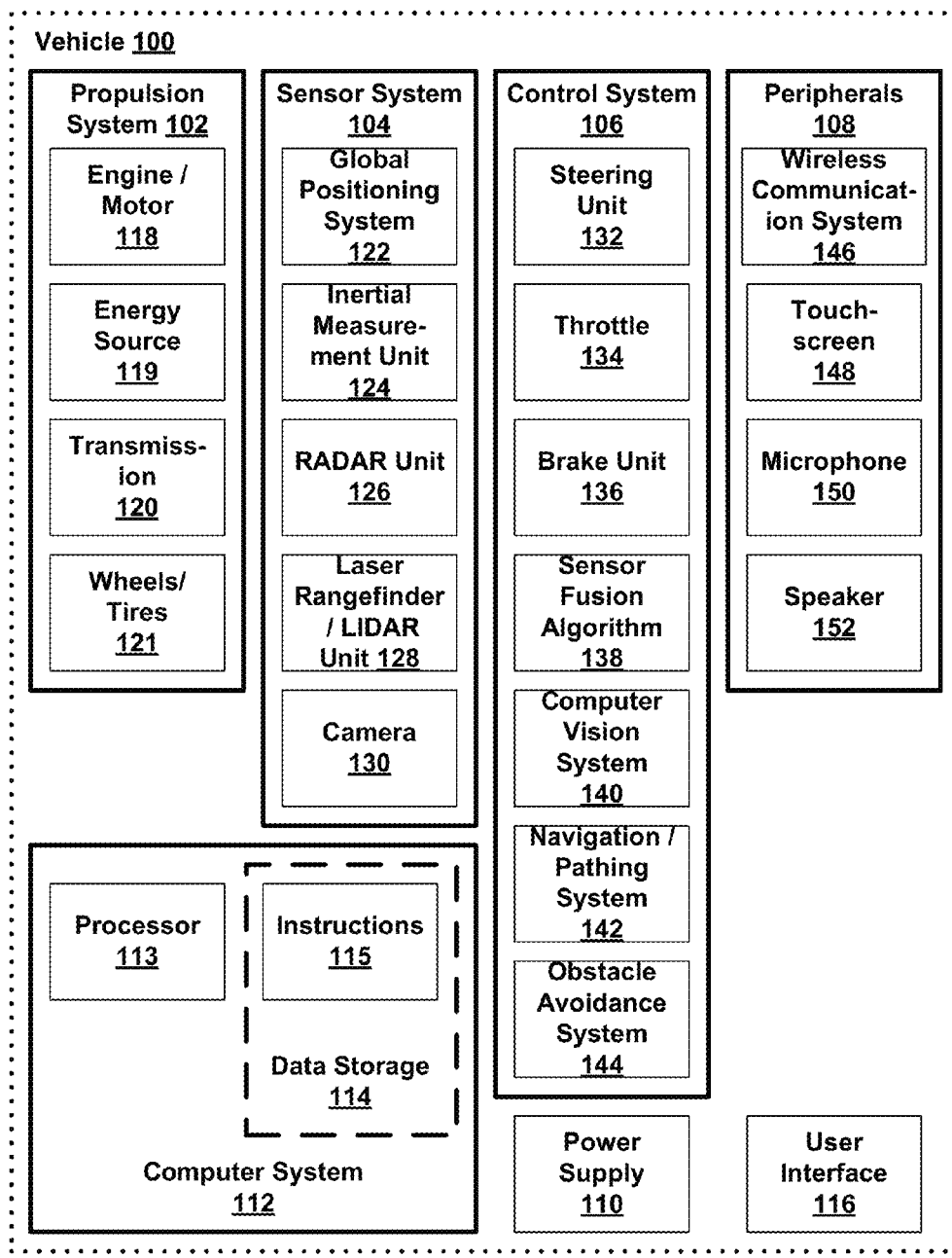
FIG. 1 is a block diagram depicting a vehicle, according to an example embodiment.

FIG. 1 is a functional block diagram illustrating a vehicle 100, according to an example embodiment. The vehicle 100 could be configured to operate fully or partially in an autonomous mode. For example, the vehicle 100 could control itself while in the autonomous mode, and may be operable to engage in an evaluation process (among other processes), in accordance with the description set forth herein. While in autonomous mode, the vehicle 100 may operate without human interaction.

The vehicle 100 could include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. To this end, the transmission 120 could include a gearbox, clutch, differential, and drive shafts. The transmission 120 could include other elements as well. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, or another combination of materials. In other embodiments, other locomotion schemes are possible either in combination with wheels/tires 121 or in substitution thereof, including, for example, tracks, treads, skis, or others.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the vehicle 100. To this end, GPS 122 could include a transceiver operable to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode. The camera 130 could include one or more devices configured to capture a plurality of images of the environment of the vehicle 100. The camera 130 could be a still camera or a video camera.

The control system 106 may be configured to control operation of the vehicle 100 and its components. Accordingly, the control system 106 could include various elements, such as steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100.

The throttle 134 could be configured to control, for instance, the operating speed of the engine/motor 118 and, in turn, control the speed of the vehicle 100.

The brake unit 136 could include any combination of mechanisms configured to decelerate the vehicle 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of vehicle 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured, perhaps in combination with elements of other vehicle systems, to map an environment, track objects, determine the state of objects, such as the color of traffic lights or numbers on a speed-limit sign, estimate object speeds, estimate a distance between an object and the vehicle, or other characteristics of obstacles.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described. Peripherals 108 may be configured to allow interaction between the vehicle 100 and external sensors, other vehicles, other computer systems, and/or a user. For example, peripherals 108 could include a wireless communication system 146, a touchscreen 148, a microphone 150, and/or a speaker 152.

In an example embodiment, the peripherals 108 could provide, for instance, means for a user of the vehicle 100 to interact with the user interface 116. To this end, the touchscreen 148 could provide information to a user of vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to the user of the vehicle 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion, lead-acid battery, or even a fixed power supply, such as a 120 Volt Alternating Current power supply. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the vehicle 100 and its subsystems.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The environment could include, among other things, another vehicle. The computer vision system 140 could recognize the other vehicle as such based on object recognition models stored in data storage 114, or other techniques.

The computer system 112 could carry out several determinations based this information about the state of the environment of vehicle 100. For example, the computer system 112 could determine one or more predicted behaviors of the other vehicle. The predicted behavior could be based on several factors including the current state of the vehicle 100 (e.g., vehicle speed, current lane, etc.) and the current state of the environment of the vehicle 100 (e.g., speed limit, number of available lanes, position and relative motion of other vehicles, etc.).

In some embodiments, the computer system 112 interfaces with data storage 114 and other systems in order to control the control system 106 based on at least on the predicted behavior, the current state of the vehicle 100, and the current state of the environment of the vehicle 100. For example, in one situation, the computer system 112 may elect to adjust nothing as the likelihood of the other vehicle staying in its own lane is high. In another situation, however, the computer system 112 may elect to control vehicle 100 to slow down slightly (by reducing throttle 134) or to shift slightly to one direction or another (by controlling steering unit 132) within the current lane in order to avoid a potential collision. Other examples of interconnection between the components of vehicle 100 are numerous and possible within the context of the disclosure.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
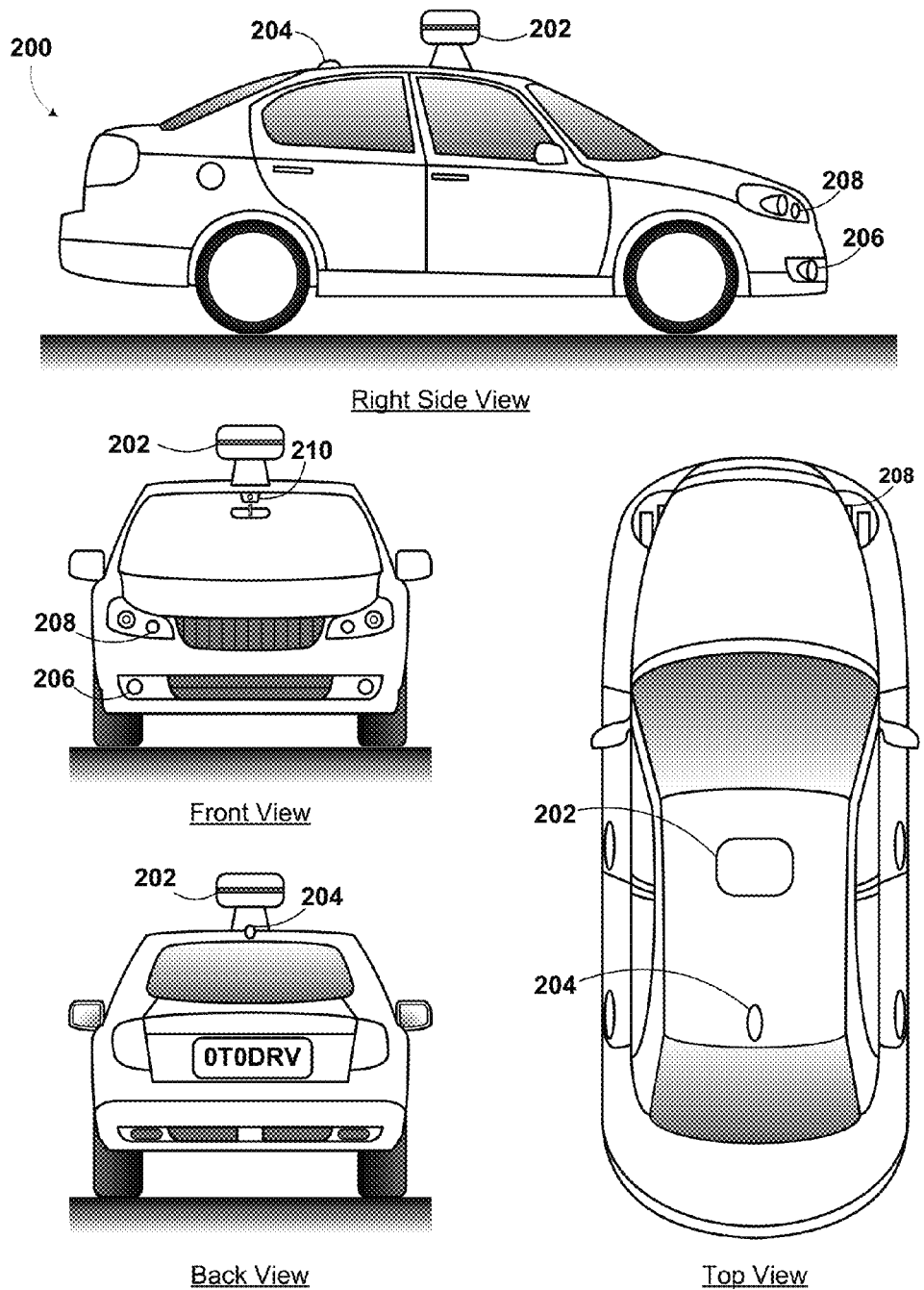
FIG. 2 depicts a vehicle, according to an example embodiment.

FIG. 2 shows a vehicle 200 that could be similar or identical to vehicle 100 described in reference to FIG. 1. In at least one embodiment, vehicle 200 includes the following sensor elements: a sensor unit 202, a wireless communication system 204, a LIDAR 206, a laser rangefinder 208, and a camera 210. In some embodiments, the sensor elements of vehicle 200, in combination perhaps with other sensor elements not described, constitute part of sensor system 104, as described with respect to FIG. 1. Although vehicle 200 is illustrated in FIG. 2 as a car, other embodiments are possible. For instance, the vehicle 200 could represent a truck, a van, a semi-trailer truck, a motorcycle, a bicycle, a golf cart, an off-road vehicle, or a farm vehicle, among other examples.

In at least one embodiment, the sensor unit 202, perhaps in conjunction with other sensor elements, is configured to capture information about an environment of the vehicle 200. For example, sensor unit 202 could include or communicatively couple with any combination of cameras, RADARs, LIDARs, range finders, and acoustic sensors. Other types of sensors are possible as well. In some embodiments, the sensor unit 202 includes one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3B:
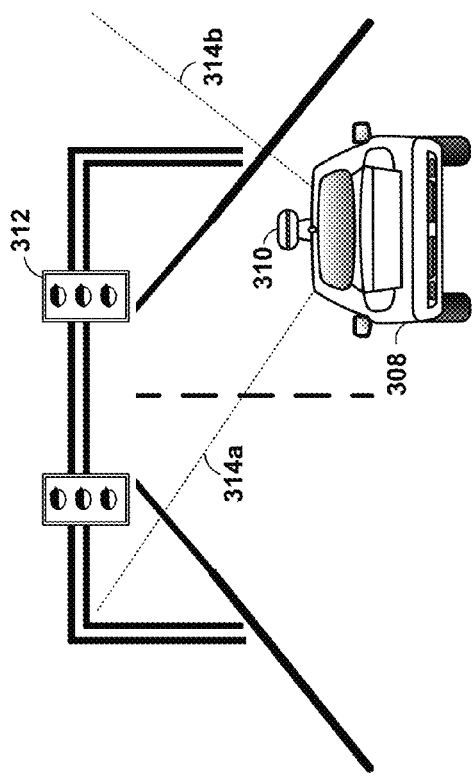
FIG. 3B is a vehicle-operating scenario, according to an example embodiment.
Figure 3A:
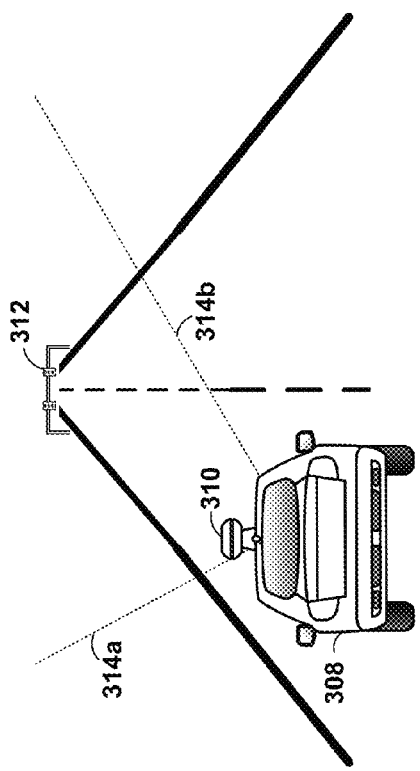
FIG. 3A is a vehicle-operating scenario, according to an example embodiment.

FIG. 3A depicts an example scenario in which a vehicle 308 is traveling on a roadway. In the example scenario, vehicle 308 may be operating in an autonomous mode and collecting sensor data via sensor 310 and perhaps other sensor elements. In particular, a vehicle controller may use a camera (not shown) mounted on vehicle 308 to capture a plurality of images of the vehicle's environment. The controller may periodically analyze the captured images to detect and track objects of interest, such as road signs and traffic lights. To assist the vehicle in its operation, a controller may make decisions based on the state of those detected objects of interest. For instance, the vehicle may proceed through an intersection when a corresponding traffic light is green. Additionally, the vehicle may adjust its speed based on posted speed-limit signs. Other examples of making decisions based on the state of detected objects are possible as well.

In the particular scenario depicted in FIG. 3A, vehicle 308 may realize that although it is currently traveling in the left-hand lane, it will soon be traveling in the right-hand lane (as a result of a predetermined travel pattern, or for some other reason). Therefore, the vehicle may be interested in the upcoming traffic light that corresponds to the right-hand lane (e.g., traffic light 312). Accordingly, the vehicle 308 may engage sensor 310 and/or other elements, such as a camera, and scan the vehicle's environment to detect the corresponding traffic light 312. Once the traffic light is detected, the vehicle may track the light and make one or more decisions based on the state of the light (i.e., whether the light is green or not). For example, as the vehicle approaches the traffic light, the vehicle may evaluate the light and proceed through the intersection if the light is green, and not proceed through the intersection if the light is not green. The vehicle may make other decisions based on the state of the light as well.

However, one problem that may arise from attempting to detect an object of interest from a relatively far distance is that the object of interest (e.g., traffic light 312) could be confused with another nearby object (e.g., a street light or a traffic light that corresponds to a different lane) that is detected by the vehicle. Therefore, to address situations like this and perhaps other situations, vehicle 308, in accordance with the embodiments described further herein, may engage in a reverse-parallax analysis of multiple images to determine whether the detected object is the object of interest (sometimes referred to as the "target object").

Generally, a vehicle, such as vehicle 308, may engage in a reverse-parallax analysis by capturing a first image of a detected object that the vehicle predicts is a target object, for example, based on map data that indicates three-space coordinates of the target object, and predicting where in a second image taken from another location the detected object would be if the detected object is the target object. If, upon capture of a second image at the other location, the vehicle determines that the detected object appears at or near the predicted position in the second image, then the vehicle 308 may use such a determination, either alone or in combination with other information, as a basis to conclude that the detected object is likely the target object. Consequently, the vehicle may take one or more actions consistent with that conclusion, such as proceeding through the intersection when the traffic light is green. On the other hand, if the vehicle determines that the detected object does not appear at or near the predicted location in the second image, then the vehicle 308 may use such a determination, either alone or in combination with other information, as a basis to conclude that the detected object is unlikely the target object. Consequently, the vehicle may take one or more actions consistent with that conclusion, such as not proceeding through the intersection or reverting to manual control.

More specifically, as described above with respect to the example scenario depicted in FIG. 3A, the vehicle 308 may be interested in the upcoming traffic light corresponding to the right-hand lane. The vehicle may engage sensor element 310 in an attempt to detect that traffic light, and as a result, may detect object 312. To confirm that object 312 is the traffic light of interest, the vehicle may then engage in a reverse-parallax analysis. In accordance with one example embodiment of reverse-parallax analysis, the vehicle 308 may capture a first image of the detected object 312. Lines 314a and 314b depict a field of view for a camera of vehicle 308, which, in some embodiments may be about 60 degrees in the horizontal direction and yielding images 3000 pixels wide, and 40 degrees in the vertical direction and yielding images 2000 pixels tall. In the embodiment discussed herein, image resolution is therefore about 50 pixels per degree or about 0.2 degrees per pixel, in either direction. However, in other embodiments, other fields of view and other pixel counts are possible.

Figure 4B:
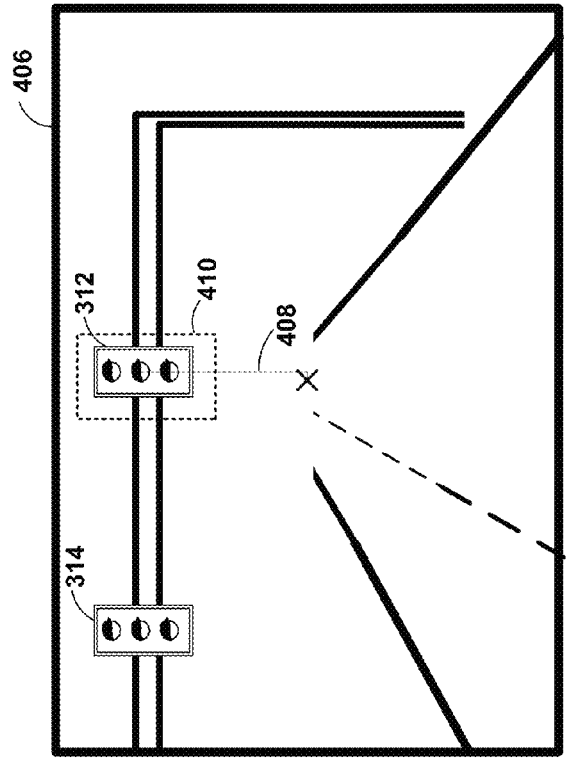
FIG. 4B is an image, according to an example embodiment.
Figure 4A:
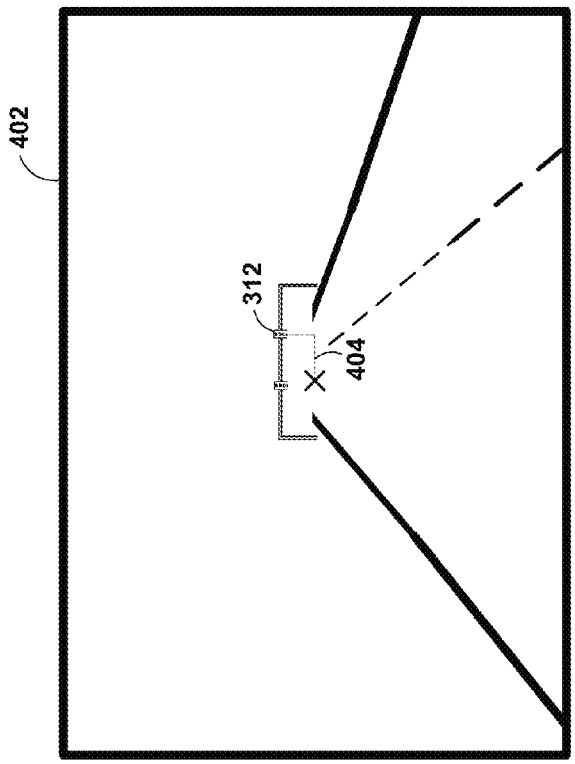
FIG. 4A is an image, according to an example embodiment.

FIG. 4A depicts an example image 402 captured via a camera located at position of the vehicle 308 in FIG. 3A. Image 402 is shown as including an X at the center that depicts the line of sight of the camera. In some embodiments, the camera's line of sight points along the vehicle's forward axis; however, in other embodiments, the camera is oriented in other directions. In embodiments in which the camera is oriented in other directions (e.g., one or two degrees off of the vehicle's forward axis), the vehicle may be provisioned with or otherwise able to access location data that specifies this camera direction. In some embodiments, upon capture, the vehicle 308 may analyze the image and evaluate where the detected object is positioned within the image. According to one example, the vehicle may evaluate this position by determining how many pixels above (or below) the center of the image the center of the detected object is. The vehicle may also determine how many pixels to the right (or left) of the center of the image the center of the detected object is. In example image 402, the center of detected object 312 is about 140 pixels above (which, in this embodiment, corresponds to about 2.8 degrees above), and about 200 pixels to the right of (which, in this embodiment, corresponds to about 4 degrees to the right of) the center of the image. Other ways of evaluating positioning within images are possible as well.

Vehicle 308 may then refer to location data, which may be provisioned on or otherwise accessed by vehicle 308. The location data may specify the location in three-space of the vehicle (and more specifically, the location in three-space of the camera from which image 402 was captured as well as the camera's direction, sometimes referred to as "line of sight"), and the target object. The vehicle may use the location data to determine the distance from the vehicle to the target object, in either direction. In the example scenario depicted in FIG. 3, the distance from vehicle 308 to target traffic light 312 may be approximately 2000 ft. The vehicle may use this information to calculate the relative line of sight of the camera (if it is different from that of the vehicle).

The vehicle 308 may then predict where in a second image taken from a second location the detected object 312 should appear if the detected object 312 is the target object. For example, the vehicle may (arbitrarily or purposefully) choose a second location that is distinct from the first location at which the vehicle captured the first image 402. In the example embodiment discussed herein, that second location is the location depicted in FIG. 3B; however, other locations are possible. After the vehicle chooses the second location, the vehicle may then refer to location data to determine the position of the camera at the second location relative to the target object. For instance, the vehicle may refer to location data and determine that at the second location depicted in FIG. 3B, the camera would be about 50 feet from the target object and about 12 feet underneath it. The vehicle may then calculate, by taking the inverse tangent of 12/50, that in an image taken at the location depicted in FIG. 3B, the target object should appear about 13.5 degrees (or about 675 pixels) above center. In embodiments in which the camera's line of sight differs from the vehicle's, the vehicle may compensate for the difference in line of sight by adding or subtracting, as appropriate, from this number.

The vehicle 308 may then move to the second location and at the second location, capture an image of the detected object. In some embodiments, a vehicle system may cause vehicle 308 to move to the second location. That is, the second location may not be along a predetermined travel pattern. In other embodiments, the second location is a location to which the vehicle would have traveled anyway. In any event, upon the capture, vehicle 308 may evaluate the image and determine if the detected object appears substantially in the predicted location. For example, in the embodiment discussed herein, the vehicle 308 may move to the location depicted in FIG. 3B. While there, the vehicle may capture image 406 depicted in FIG. 4B. In image 406, target area 410 represents the location where, based on the above calculations, the vehicle 308 expects detected object 312 to appear if detected object 312 is the target object (e.g., 675 pixels above center, represented by measurement line 408). Upon an analysis of image 406, the vehicle may determine that a threshold number of pixels that constitute detected object 312 appear within the target area 410. Consequently, the vehicle may conclude, either alone or in combination with other information, that detected object 312 is most likely the target object, and take one or more actions consistent with that conclusion. If instead of detected object 312, the vehicle was tracking object 314 (the other of the two depicted traffic lights in FIGS. 3B and 4B), upon an analysis of image 406, the vehicle may determine that a threshold number of pixels that constitute detected object 314 do not appear within the target area 410. Consequently, the vehicle may conclude, either alone or in combination with other information, that detected object 314 is unlikely to be the target object, and take one or more actions consistent with that conclusion. Those skilled in the art will realize that, given the entirety of this description, other ways of carrying out a reverse-parallax analysis are possible as well.

Furthermore, in accordance with another embodiment, a vehicle, such as vehicle 308, may be equipped with two or more cameras. The cameras may be positioned at different locations on the vehicle (e.g., on either side of the windshield). In operation, the vehicle may engage sensor unit 310 to detect what the vehicle thinks is a target object. To confirm that the detected object is most likely the target object, the vehicle may simultaneously capture images from both cameras. The vehicle may then refer to location data that specifies the location of the vehicle (and thus the location of each camera) and the location of the target object so that the vehicle can determine the relative position and orientation of each camera to the target object. In a manner similar to that which is discussed above (but omitted here for brevity's sake), the vehicle may predict, based on the location data and based on where the detected object appears in one image, where in the other image the detected object should appear if the detected object is the target object. Still other examples are possible as well.

Additionally, although the above description made reference to two captured images, in some embodiments, the vehicle may carry out a reverse-parallax analysis by capturing three, four, or any number of images. In such embodiments, for example, after capturing the second image and determining whether the detected object appears at or near the predicted position in the second image, the vehicle 308 may continue to capture images from different locations. Moreover, the vehicle may continue to predict, based on location data and where the detected object appears in each of the previous images, where in each subsequent image the detected object would be if the detected object is the target object. Accordingly, if the vehicle determines that the detected object appears at or near its respective predicted position in every image, then the vehicle 308 may use such a determination, either alone or in combination with other information, as a basis to conclude that the detected object is likely the target object. On the other hand, if the vehicle determines that in at least one image, the detected object does not appear at or near its predicted position, then the vehicle 308 may use such a determination, either alone or in combination with other information, as a basis to conclude that the detected object is unlikely the target object. Still other examples are possible as well.

Figure 5:
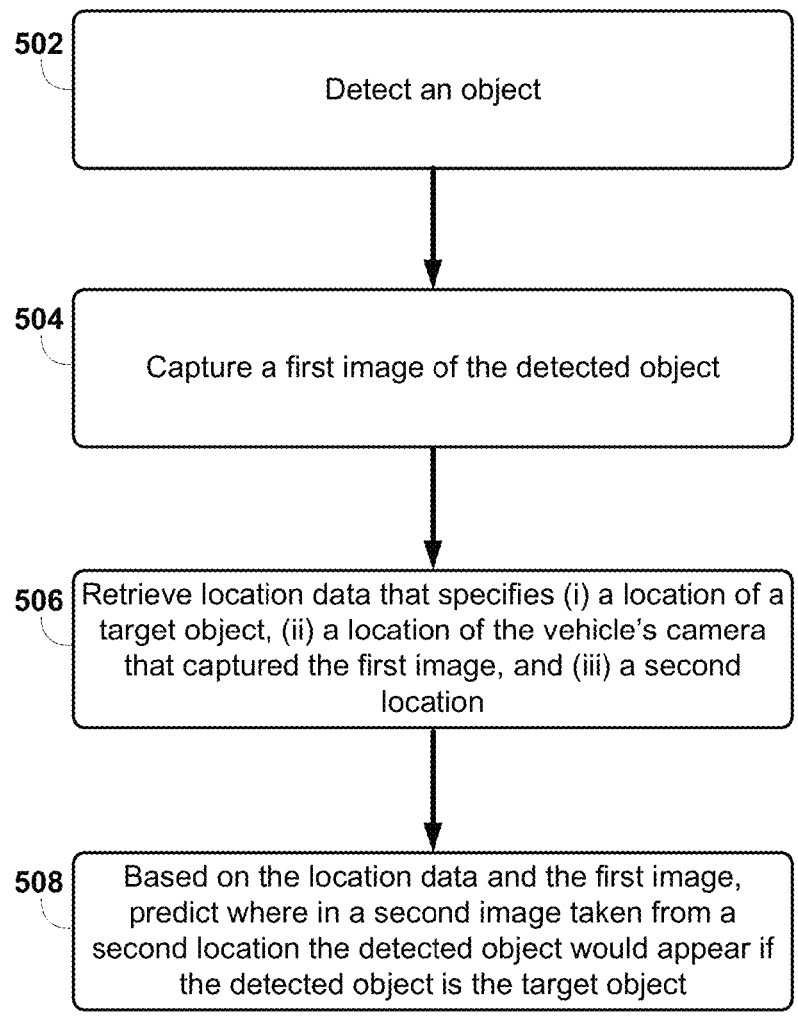
FIG. 5 depicts a flow diagram, according to an example embodiment.

FIG. 5 is a flow diagram that depicts an example reverse-parallax analysis process. The example process may include one or more operations, functions, or actions, as depicted by one or more of blocks 502, 504, 506, and/or 508, each of which may be carried out by any of the systems described by way of FIGS. 1-4; however, other configurations could be used.

Furthermore, those skilled in the art will understand that the flow diagram described herein illustrates functionality and operation of certain implementations of example embodiments. In this regard, each block of each flow diagram may represent a module, a segment, or a portion of program code, which includes one or more instructions executable by a processor (e.g., processor 113 in computer system 112 described above with respect to vehicle 100) for implementing specific logical functions or steps in the process. The program code may be stored on any type of computer readable medium (e.g., computer readable storage medium or non-transitory media, such as data storage 114 described above with respect to vehicle 100), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

As shown, the flow diagram begins at block 502 where a vehicle detects an object, referred to thereafter as the detected object. As described above, the vehicle may use at least one sensor element, such as a camera, RADAR, laser rangefinder/LIDAR, or other element to detect an object. The vehicle may consider the detected object to likely be a target object; and the vehicle may engage in the reverse-parallax analysis process to confirm that consideration or to gain confidence. Other ways of collecting such data exists as well.

At block 504, the vehicle captures a first image of the detected object. As described above, the vehicle may use a camera to capture a first image of the detected object. The camera may be mounted anywhere on or within the vehicle, and may have a line of sight similar to the forward-facing axis of the vehicle. The camera may be one of a plurality of cameras mounted on or within the vehicle. Other ways to capture a first image of the detected object are possible as well.

At block 506, the vehicle retrieves location data that specifies (i) a location of the target object, (ii) the location of the camera, and (iii) a second location. In some embodiments, the location data may additionally specify the direction of the camera. The location data may be provisioned on board the vehicle, such as within a navigational computer or other data storage. Alternatively, the vehicle may connect to a remote data store to retrieve the location data. In any event, the location data may indicate the distance from the vehicle to the target object at the current location and at a second location. As described above, in embodiments in which the camera's direction is not specified in the location data, the vehicle may the vehicle may determine the camera's direction (i.e., line of sight) based on differences in where the detected object appears in the image compared to where the target object is located relative to the camera.

Finally, at block 508, based on the location data and where in the first image the detected object appears, the vehicle predicts where the detected object would appear in a second image taken from the second location if the detected object is the target object. As described above, the vehicle may establish a prediction zone. Thus, upon capture of an image from the second location, if a threshold amount of the detected object Example processes, such as the one depicted in FIG. 5, as well as other example processes described herein, may be carried out in whole or in part by the vehicle and its subsystems. However, it should be understood that an example process may be implemented in whole or in part by other computing devices, such as those located remotely from the vehicle. For example, an example process may be implemented in whole or in part by a server system, which receives data from a device such as those associated with the vehicle. Other examples of computing devices or combinations of computing devices that can implement an example process are possible.

Figure 6:
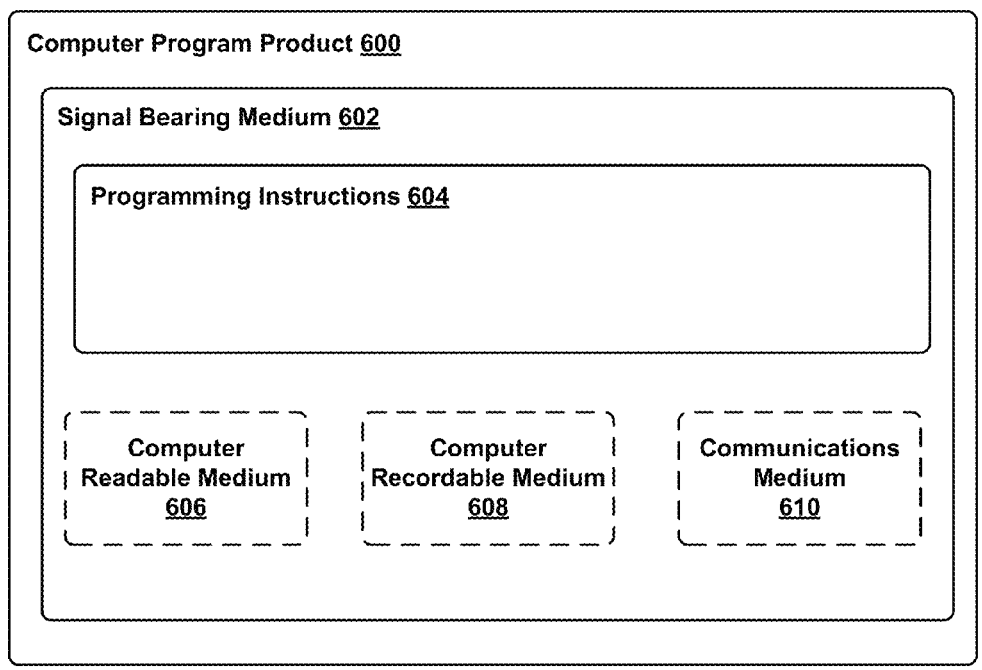
FIG. 6 is a schematic diagram of a computer program product, according to an example embodiment.

In some embodiments, processes described herein may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the processor 113 by one or more of the computer readable medium 606, the computer recordable medium 608, and/or the communications medium 610 (e.g., instructions 115 stored in data storage 114).

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and processes with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   a vehicle system detecting an object, the vehicle system being communicatively coupled with a vehicle;
   the vehicle system simultaneously (i) capturing, via a first camera located at a first location, a first image of the detected object, the detected object having a position in the first image, and (ii) capturing, via a second camera located at a second location, a second image of the detected object;

the vehicle system retrieving location data specifying (a) a location of a target object, (b) the first location, (c) the second location, (d) a direction of the first camera, and (e) a direction of the second camera; and based on the location data and the position of the detected object in the first image, the vehicle system predicting where in the second image the detected object would appear if the detected object is the target object.

2. The method of claim 1, wherein the first location is a location of the first camera mounted on the vehicle, and wherein the second location is a location of the second camera mounted on the vehicle.

3. The method of claim 2, wherein the first location and the second location are distinct locations.

4. The method of claim 1, further comprising:
the vehicle system evaluating whether the detected object appears in a predetermined area of the second image, the predetermined area being based on the prediction of where in the second image the detected object would appear if the detected object is the target object.

5. The method of claim 4, further comprising:
based on the evaluating, the vehicle system determining that the detected object does not appear in the predetermined area of the second image; and
in response to the determining, the vehicle system identifying the detected object as an object other than the target object.

6. The method of claim 5, wherein the vehicle system predicting where in the second image the detected object would appear if the detected object is the target object comprises the vehicle system designating as a prediction zone a certain number of pixels of the second image, and
wherein evaluating whether the detected object appears in a predetermined area of the second image comprises the vehicle system determining whether a threshold number of pixels of the detected object appears within the prediction zone.

7. The method of claim 6, further comprising:
based on the location data and a position of the detected object in the second image; the vehicle system predicting where in the first image the detected object would appear if the detected object is the target object.

8. The method of claim 7, further comprising:
the vehicle system evaluating whether the detected object appears in a predetermined area of the first image, the predetermined area being based on the prediction of where in the first image the detected object would appear if the detected object is the target object.

9. The method of claim 1, further comprising:
after predicting where in the second image the detected object would appear if the detected object is the target object, the vehicle system capturing, via a third camera located at a third location, a third image of the detected object;
the vehicle system retrieving additional location data specifying (a) the third location and (b) a direction of the third camera; and
based on the additional location data and further based on the predicting of where in the second image the detected object would appear if the detected object is the target object, the vehicle system predicting where in the third image the detected object would appear if the detected object is the target object.

10. The method of claim 9, wherein the third location is distinct from one or both of the first location and the second location.

11. The method of claim 9, wherein the third camera is the same camera as either the first camera or the second camera, and
wherein the third location is the same location as either the first location or the second location.

12. The method of claim 1, further comprising:
after predicting where in the second image the detected object would appear if the detected object is the target object, based on the location data and further based on the predicting of where in the second image the detected object would appear if the detected object is the target object, the vehicle system (i) selecting a third location distinct from the first location and the second location and (ii) predicting where in a third image captured from the third location the detected object would appear if the detected object is the target object, wherein the predicting where in the third image the detected object would appear if the detected object is the target object occurs without having captured the third image from the third location; and
after selecting the third location and predicting where in the third image the detected object would appear if the detected object is the target object, the vehicle system causing the vehicle to move to the third location.

13. The method of claim 12, wherein the vehicle system selecting a third location distinct from the first location and the second location comprises:
the vehicle system selecting a third location along a predetermined travel pattern of the vehicle.

14. The method of claim 12, wherein the vehicle system selecting a third location distinct from the first location and the second location comprises:
the vehicle system selecting a third location that is not along a predetermined travel pattern of the vehicle.

15. The method of claim 1, wherein the first location and the second location are along a predetermined travel pattern of the vehicle.

16. A vehicle comprising:
a vision system;
at least one processor; and
data storage comprising instructions executable by the at least one processor to cause the system to perform operations, the operations comprising:
causing the vision system to detect an object;
causing the vision system to simultaneously (i) capture, via a first camera located at a first location, a first image of the detected object, the detected object having a position in the first image, and (ii) capture, via a second camera located at a second location, a second image of the detected object;
retrieving location data specifying (a) a location of a target object, (b) the first location, (c) the second location, (d) a direction of the first camera, and (e) a direction of the second camera; and
based on the location data and the position of the detected object in the first image, predicting where in the second image the detected object would appear if the detected object is the target object.

17. The vehicle of claim 16, the operations further comprising:
after predicting where in the second image the detected object would appear if the detected object is the target object, capturing, via a third camera located at a third location, a third image of the detected object;
retrieving additional location data specifying (a) the third location and (b) a direction of the third camera; and based on the additional location data and further based on the predicting of where in the second image the detected object would appear if the detected object is the target object, predicting where in the third image the detected object would appear if the detected object is the target object.

18. A non-transitory computer readable medium (CRM) having stored thereon instructions executable by a computing device to cause the computing device to perform operations, the operations comprising:
   detecting an object in an environment of a vehicle;
   simultaneously (i) capturing, via a first camera located at a first location, a first image of the detected object, the detected object having a position in the first image, and (ii) capturing, via a second camera located at a second location, a second image of the detected object;
   retrieving location data specifying (a) a location of a target object, (b) the first location, (c) the second location, (d) a direction of the first camera, and (e) a direction of the second camera; and
   based on the location data and the position of the detected object in the first image, predicting where in the second image the detected object would appear if the detected object is the target object.

19. The CRM of claim 18, wherein predicting where in the second image the detected object would appear if the detected object is the target object comprises designating as a prediction zone a certain number of pixels of the second image, and wherein the operations further comprise:
   evaluating whether the detected object appears in a predetermined area of the second image by determining whether a threshold number of pixels of the detected object appears within the prediction zone.

20. The CRM of claim 18, the operations further comprising:
   after predicting where in the second image the detected object would appear if the detected object is the target object, based on the location data and further based on the predicting of where in the second image the detected object would appear if the detected object is the target object, (i) selecting a third location distinct from the first location and the second location and (ii) predicting where in a third image captured from the third location the detected object would appear if the detected object is the target object, wherein the predicting where in the third image the detected object would appear if the detected object is the target object occurs without having captured the third image from the third location; and
   after selecting the third location and predicting where in the third image the detected object would appear if the detected object is the target object, causing the vehicle to move to the third location.

* * * * *